United States Patent
Mani

(10) Patent No.: US 8,411,700 B2
(45) Date of Patent: Apr. 2, 2013

(54) DLP-BASED WIRELESS DOCKING FOR WIFI-BASED ENDPOINTS WITH DESKTOP

(75) Inventor: Mahalingam Mani, Cupertino, CA (US)

(73) Assignee: Avaya Inc., Basking Ridge, NJ (US)

( * ) Notice: Subject to any disclaimer, the term of this patent is extended or adjusted under 35 U.S.C. 154(b) by 458 days.

(21) Appl. No.: 12/731,850

(22) Filed: Mar. 25, 2010

(65) Prior Publication Data

US 2011/0235530 A1  Sep. 29, 2011

(51) Int. Cl.
 *H04B 7/00* (2006.01)
 *H04W 4/00* (2009.01)
 *H04J 3/02* (2006.01)

(52) U.S. Cl. .......................... 370/462; 370/310; 370/328

(58) Field of Classification Search .................. 370/310, 370/311, 328, 335, 336, 338, 345, 346, 347, 370/348, 445, 449, 461, 462; 709/238, 242
See application file for complete search history.

(56) References Cited

U.S. PATENT DOCUMENTS

2003/0231608 A1* 12/2003 Wentink ........................ 370/338
2009/0131026 A1 5/2009 Allen et al.

* cited by examiner

*Primary Examiner* — Kwang B Yao
*Assistant Examiner* — Adam Duda
(74) *Attorney, Agent, or Firm* — Sheridan Ross P.C.

(57) ABSTRACT

Methods, devices, and systems for automatically controlling the establishment and/or termination of inter-client Data Link Protocol (DLP) communication channels. More specifically, methods, devices, and systems are provided for establishing an inter-client DLP communication channel on demand for communication sessions and terminating the same upon completion of such communication sessions.

18 Claims, 3 Drawing Sheets

DLP-BASED WIRELESS DOCKING FOR WIFI-BASED ENDPOINTS WITH DESKTOP

FIELD OF THE DISCLOSURE

The disclosure relates generally to communications and more specifically to establishing and managing ad hoc communication architectures.

BACKGROUND

In computing, a softphone is a software program for making telephone calls over the Internet using a general purpose computer, rather than using dedicated hardware. Often a softphone is designed to behave like a traditional telephone, sometimes appearing as an image of a phone, with a display panel and buttons with which the user can interact. A softphone is usually used with a headset connected to the sound card of the PC, laptop, or the like, or with a USB phone.

Traditionally, softphone applications operate on a computing device in cooperation with an actual communication device (e.g., telephone). Thus, it is usually the case that the computing device has to be connected to the communication device via wires or the like. One painpoint in establishing a softphone solution is that the use of wires is required to connect the computing device to the communication device. This means that most portable computing devices (e.g., laptops) and most portable communication devices (e.g., cell phones) have not been prime candidates for softphone implementations. Rather, most softphone applications have been traditionally deployed in a fixed computer and communication device set up.

While the use of docking stations has allowed laptops to be included in the types of computing devices which leverage a softphone application, a physical docking station still has to be purchased before such a configuration is implemented. These additional information technology costs are usually optional and not supported by many small to mid-sized enterprises. Even the wire-free Bluetooth solutions, which replace traditional cables in creating a Personal Area Network (PAN), require a significant amount of manual administration. In particular, before a Bluetooth link is established between a computing device and a communication device, a user is often required to manually accept associations or worse enable Bluetooth communications on one or both devices before an association is allowed. The later case is usually the most commonly encountered since Bluetooth is known to cause interference with other Wireless Fidelity (WiFi) connections (which operate in the 2.4 GHz range). Therefore, Bluetooth connections between a computing device and communication device are usually not advised when implementing a softphone application.

The establishment of Direct Link Protocol (DLP) communication channels between WiFi enabled devices has been standardized in the 802.11x standard (in particular within 802.11n), the entire contents of which are hereby incorporated herein by reference. The original intended application of the DLP side-channels established in accordance with 802.11n was in high bandwidth interactions between adjacent multi-media devices used in home entertainment (e.g., DVD players, Blu-ray players, TVs, receivers, speakers, etc.).

With reference to FIG. 1, a particular problem of most softphone applications implemented with wireless connections is that an access point 108 (e.g., 802.11 router) is required to connect a computing device 116 and a communication device 112. The primary problem with this type of system 100 configuration is that inter-client communication packets (i.e., packets which are to be transmitted from the communication device 112 to the computing device 116 and vice versa) must traverse the access point 108. This consumes a significant amount of processing resources at the access point 108 in addition to consuming a significant amount of bandwidth. Since this additional burden is placed on the access point 108, communications to and from the communication network 104 may be delayed. Moreover, communications between the communication device 112 and computing device 116 are also delayed. All of this results in the user 102 experiencing a sub-optimal performance of the softphone application. Often times this causes the user 102 to blame the communication device 112 or the softphone application as being inferior, which may negatively affect the reputation of the entity which provided the communication device 112 or softphone application.

While the standards of 802.11 can be employed to establish a DLP-side channel between the computing device 116 and communication device 112 (thereby bypassing the access point 108), there are still problems associated with actually administering such a connection. In particular, the standards of 802.11 require a significant amount of user intervention and setup before such an inter-client communication channel is established. Thus, the standards set forth in 802.11 for establishing a DLP communication channel between a computing device 116 and a communication device 112 have not yet been fully developed in the area of real-time communications.

SUMMARY

It is, therefore, one aspect of the present disclosure to provide a communication method which allows for the ad hoc establishment and termination of inter-client DLP-side channels for use in connection with a particular communication session. In particular, the utilization of a DLP-side channel is possible for the duration of a communication session, thereby enabling a softphone solution whereby the computing device is wirelessly communicating with the communication device and vice versa.

The inter-client DLP-side channel can be used to carry large bandwidth communication packets without burdening an access point. This enables softphone applications to support video communications, high definition video, high definition audio, and other large bandwidth-consuming applications. Thus, if a user desires, video processing equipment of a computing device can be used in connection with communication sessions established by a communication device on demand and without consuming the processing resources of the access point or precious limited bandwidth within the 2.4 GHz range.

In accordance with at least some embodiments a method is provided that generally comprises:

monitoring communication activity at one or more of a computing device and a communication device;

determining that a DLP-triggering event has occurred at one or both of the computing device and communication device; and based on the determining step, establishing a DLP-side channel between the computing device and the communication device.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

The terms "determine," "calculate" and "compute," and variations thereof, as used herein, are used interchangeably and include any type of methodology, process, mathematical operation or technique.

The term "module", "agent", or "tool" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed.

The preceding is a simplified summary of embodiments of the disclosure to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below.

DETAILED DESCRIPTION

The disclosure will be illustrated below in conjunction with an exemplary communication system. Although well suited for use with, e.g., a system using a server(s) and/or data base(s), the disclosure is not limited to use with any particular type of communication system or configuration of system elements. Those skilled in the art will recognize that the disclosed techniques may be used in any communication application in which it is desirable to automatically establish inter-client communication channels.

The exemplary systems and methods of this disclosure will also be described in relation to analysis software, modules, and associated analysis hardware. However, to avoid unnecessarily obscuring the present disclosure, the following description omits well-known structures, components and devices that may be shown in block diagram form, are well known, or are otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
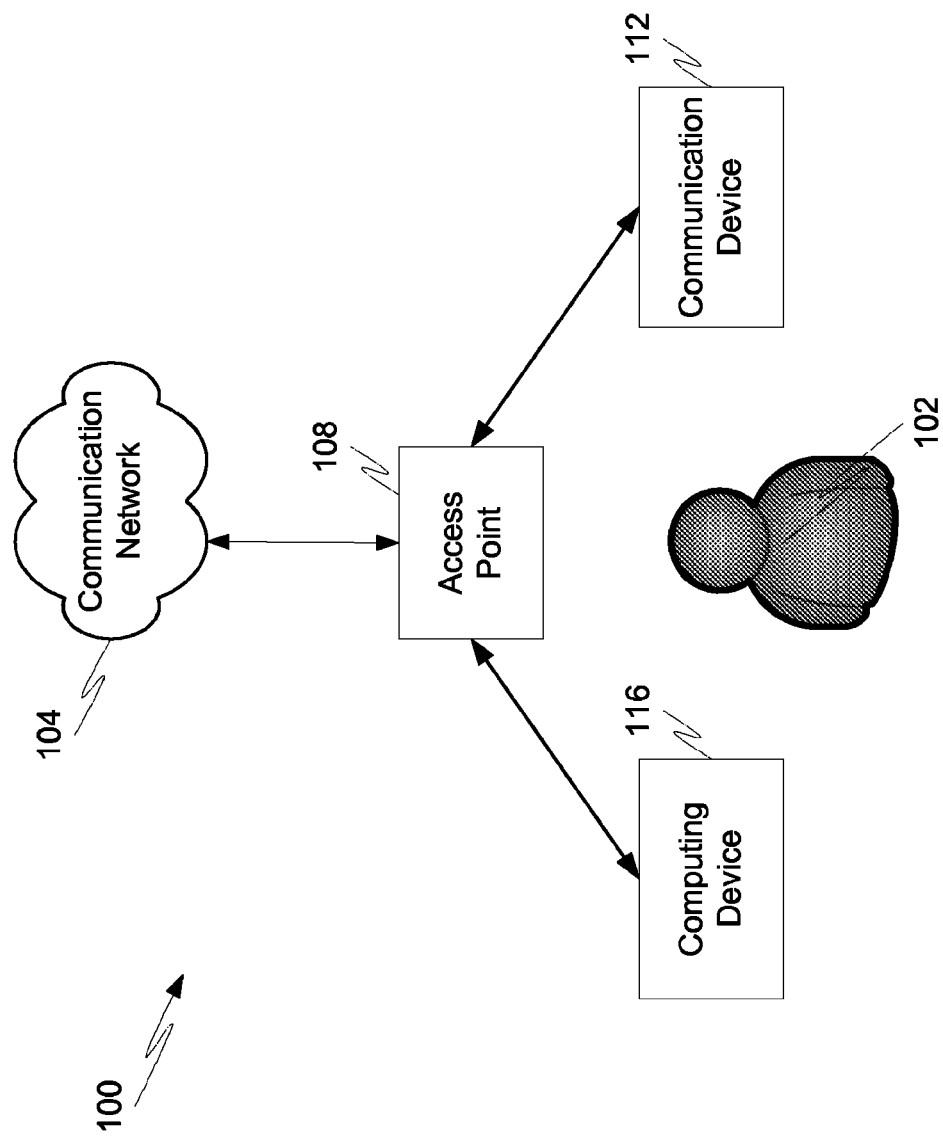
FIG. 1 is block diagram depicting a communication system in accordance with embodiments of the prior art.
Figure 2:
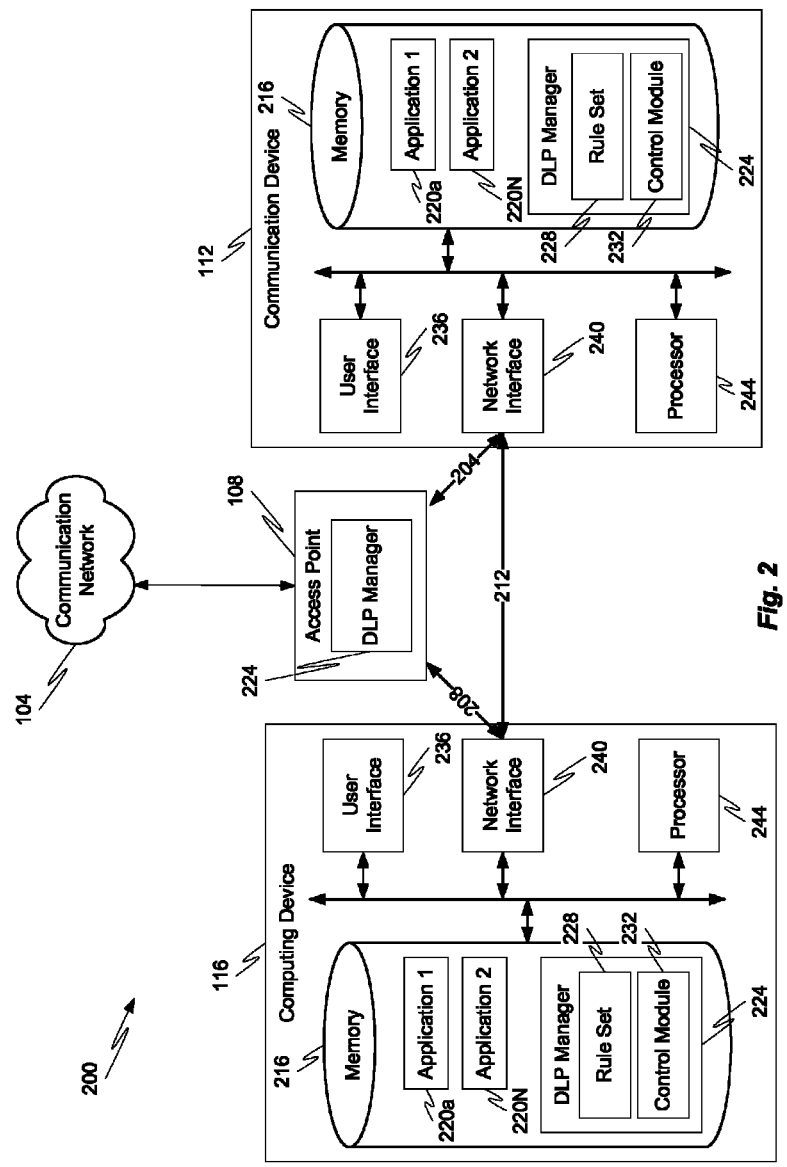
FIG. 2 is a block diagram depicting a communication system in accordance with at least some embodiments of the present disclosure.

Referring now to FIG. 2, an exemplary communication system 200 is depicted in accordance with at least some embodiments of the present disclosure. The communication system 200 may comprise a communication network 104 that facilitates communications (e.g., voice, image, video, data, other non-voice media types employing protocols that support conversational text, and combinations thereof) between various communication devices.

In some embodiments, one communication device 112 that is a participant to a communication session established over the communication network 104 is accessing the communication network via an access point 108. In some embodiments, the access point 108 may correspond to a wireless router used to route communication packets between the communication network 108 and the communication device 112 is accordance with 802.11 standards, the entire contents of which are hereby incorporated herein by reference.

The communications between the communication device 108 and other communication devices may be direct communications or, in some embodiments, may be facilitated by a communications server and/or switch. In other embodiments, communication sessions established at the communication device 112 may be assisted with a nearby computing device 116. In particular, a computing device 116 which is also in communication with the access point 108 may be implementing a softphone application to enhance a user's experience during the communication session.

In some embodiments of the present disclosure, a first wireless communication link 204 may be established between the communication device 112 and the access point 108. The first wireless communication link 204 may be utilized to carry communication and/or control packets that are communicated to the other communication device(s) engaged in the communication session. Thus, packets transmitted via the first wireless communication link 204 are either transmitted from the communication device 112 for subsequent transmission across the communication network 104 or received at the access point 108 from the communication network 104 and subsequently transmitted to the communication device 112.

A second wireless communication link 208 may be established between the computing device 116 and the access point 108. The second wireless communication link 208 is generally used to carry packets between the communication network 104 and the computing device 116 that are not specific to a communication session established by the communication device 112. As one example, packets used for Hyper Text Transport Protocol (HTTP) exchanges and its variations may be carried via the second wireless communication link 208.

A third wireless communication link 212 may be established between the communication device 112 and the computing device 116 (i.e., between the client devices). In some embodiments, the third wireless communication link 212 is utilized to carry media and/or control packets that are associated with a particular communication session between the client devices. Thus, inter-client communications during a communication session established at the communication device 112 do not have to traverse the access point 108, thereby unnecessarily consuming the resources of the access point 108. In some embodiments, control packets used to implement a softphone application at the computing device 116 traverse the third wireless communication link 212. In some embodiments, media packets that are rendered by the computing device (e.g., using speakers or video capabilities of the computing device 116) on behalf of the communication device 112 traverse the third wireless communication link 212.

The communication network 104 may be any type of known communication medium or collection of communication media and may use any type of protocols to transport messages between endpoints. The communication network 104 may include wired and/or wireless communication technologies. The Internet is an example of the communication network 104 that constitutes an IP network consisting of many computers and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a cellular communication network, a satellite communication network, any type of enterprise network, and any other type of packet-switched or circuit-switched network known in the art. Generally speaking however, the communication network 104 comprises at least one packet-based communication network. In addition, it can be appreciated that the communication network 104 need not be limited to any one network type, and instead may be comprised of a number of different networks and/or network types.

The communication device 112 may be any type of known communication or processing device such as a Digital Control Protocol (DCP) phone, VoIP telephones, Push-To-Talk (PTT) telephony devices, a mobile or cellular phone, a smart phone, or the like.

Exemplary computing devices 116 include, without limitation, a computer (e.g., personal computer, laptop, or Personal Digital Assistant (PDA)), a TV, an audio receiver, a portable audio player (e.g., an mp3 player), or combinations thereof. In accordance with at least some embodiments of the present disclosure, the computing device 116 is used in conjunction with the communication device 112 to implement a softphone. In other embodiments, superior audio and/or video processing/rendering components of the computing device 116 are used to supplement or replace the audio and/or video processing/rendering components of the communication device 112.

The term "softphone" as used herein should be understood to include any type of device or collection of devices comprising a processor and memory and having one or more communication applications stored thereon that utilize a communication network interface, which may or may not be resident on the same device implementing the communications processing. The communication applications stored on the communication device 112 allow the communication device to operate and behave like a traditional phone having dedicated hardware for facilitating communications. A softphone, on the other hand, does not generally have dedicated hardware to facilitate real-time communications with other users of other communication devices. Rather, the softphone utilizes one or more of its applications to facilitate such communications. In some embodiments, the softphone may be embodied as a single device (e.g., a PC, laptop, or similar type of personal workstation) which is connected to the Internet. In other embodiments, the softphone may be embodied as multiple devices where one device comprises the communication application(s) but is connected to another simple telephone which provides the connection between the device having the application(s) and the PSTN, for example. Other configurations of softphones are well known to those skilled in the art and are, therefore, not elaborated further herein.

The communication device 112 and computing device 116 may be controlled by or associated with a single user. In general the communication device 112 may be adapted to support video, audio, text, and/or data communications with other communication devices 112 and the computing device 116 is provided to supplement or replace the communication functions of the communication device 112. In some embodiments, the computing device 116 is simply used as a mechanism for controlling the operation of the communication device 112. In other embodiments, the communication device 112 may retrieve data from the computing device 116 (e.g., contact information, call history, contextual information, collaboration documents, etc.) via the third wireless communication link 212. The type of medium used by the communication device 112 to communicate with other communication devices may depend upon the communication applications available on the communication device 112.

The communication device 112 may comprise various components that enable it to transmit and receive packets containing voice, video, text, and/or data communications across the communication network 104. A communication device 112 may, therefore, include a memory 216 and a processor 244. As noted above, the memory 216 may include a number of applications or executable instructions that are readable and executable by the processor 244. For instance, the memory 216 may include a plurality of communication applications 220*a*-N (where N is greater than or equal to one) and a DLP manager 224

The computing device 116 may be similar to the communication device 112 in that is also comprises memory 216 and a processor 244. In some embodiments, the communication device 112 is actually a computing device with communication functionality. However, certain attributes of the memory 216 or processor 244 of the computing device 116 may be superior to certain attributes of the memory 216 or process 255 of the communication device 112.

The communication applications 220*a*-N may be specifically used by the communication device 112 for communicating via a particular medium or possibly via a different standard in the same medium. As one example, the first application 220*a* may correspond to a voice-based application and the Nth application 220N may correspond to a video-based application.

The applications 220*a*-N on the computing device 116 may also include one or more communication applications. Other types of applications which may be maintained on the computing device 116 and executed thereby include an operating system, which is a high-level application used to provide convenient user access to other applications 220*a*-N of the computing device 116. Another type of application maintained on the computing device 116 is a softphone application which provides an interface to the communication device 112 by translating inputs received at the computing device 116 into inputs recognized by the communication device 112. Thus, the softphone application may operate as a control interface for the communication device 116. Similarly, the softphone application may also provide the mechanisms which allow outputs of the communication device 112 to be recognized by the computing device 116 and processed thereby.

The DLP manager 224 may comprise the functionality which allows ad hoc DLP-side channels to be established between the communication device 112 and the computing device 116. In particular, the DLP manager 224 may comprise a rule set 228 and a control module 232 for implementing the rules contained within the rule set 228. The rule set 228 may include rules or conditions which, when satisfied, cause the third wireless communication link 212 to be established. The rule set 228 may also include rules or conditions which, when satisfied, cause the third wireless communication link 212 to be terminated. The rule set 228 may also includes rules for routing packets during a communication session either via the third wireless communication link 212 or via the first communication link 204, depending upon the characteristics of such packets. The control module 232 is configured to monitor activity of the communication device 112 and/or computing device 116 to enforce the parameters of the rule set 228.

In addition, the communication device 112 and computing device 116 may each comprise a user interface 236 that is adapted to facilitate user control of the same. The client devices may also include a network interface 240 that is adapted to connect the establish inter-client communication links and/or communication links with the access point 108.

The network interface 240 may comprise a wireless network adapter having a wireless antenna and modulation/demodulation unit or any other type of device or driver adapted to condition packets for wireless transmission or receive wirelessly transmitted packets and condition the same for processing by the processor 244. The network interface 240 may also include mechanisms which support wired communication links to the access point 108 and/or communication network 104. For example, the network interface 240 may include an Ethernet card and/or Ethernet port. However, in preferred embodiments, wireless communication mechanisms are used at least for the inter-client connections. Examples of network interfaces 240 include, without limitation, a network interface card, an 802.11x network card and driver, a modem, a wired telephony port, a serial or parallel data port, radio frequency broadcast transceiver, a USB port, or other wired or wireless communication network interfaces.

The user interface 236 may comprise any type of known user input and/or user output technologies. For example, the user interface 236 may comprise a GUI to facilitate visual communication control of a voice communication session as well as facilitate text and video-based communication sessions. Additionally, the user interface 236 may comprise an audio interface (e.g., speaker and microphone) which allows the user to hear voice communications and project voice communications to the other communication session participants. In some embodiments the user input and user output portions of the user interface 236 may be separate and distinct. In other embodiments, the user input and user output portions of the user interface 236 may be combined, such as in a touch-screen interface.

Each application 220a-N may also have its own dedicated interface window or control screen that allows a user of the communication device 112 and/or computing device 116 to control the application 220 and further control the communication session, or at least the medium controlled by the application 220. Thus, if multiple media are being used during a single communication session, multiple windows may be opened and displayed on the user interface 236. In accordance with at least some embodiments of the present disclosure, when an application is invoked during an established communication session and that application requires an inter-client connection that has not yet been established, the DLP manager 224 may cause the third wireless communication link 212 to be automatically established for as long as the application is in use. Moreover, the interface window for that application may also be automatically displayed via the user interface 236.

As can be seen in FIG. 2, the DLP manager 224 may be embodied in one or more of the components of the communication system 200. In some embodiments, a single DLP manager 224 may be provided that is capable of monitoring the activity of all components within the communication system 200. In other embodiments, multiple DLP managers 224 may be provided in multiple different components of the communication system 200.

Additionally, one skilled in the art will appreciate that the communication device 112 may operate as the access point 108 or have functionality sufficient to emulate an access point 108. In particular, the communication device 112 may comprise wireless routing capabilities consistent with the 802.11x standards. In this event, the second wireless communication link 208 may not exist and the third wireless communication link 212 may be established ad hoc as described herein.

Figure 3:
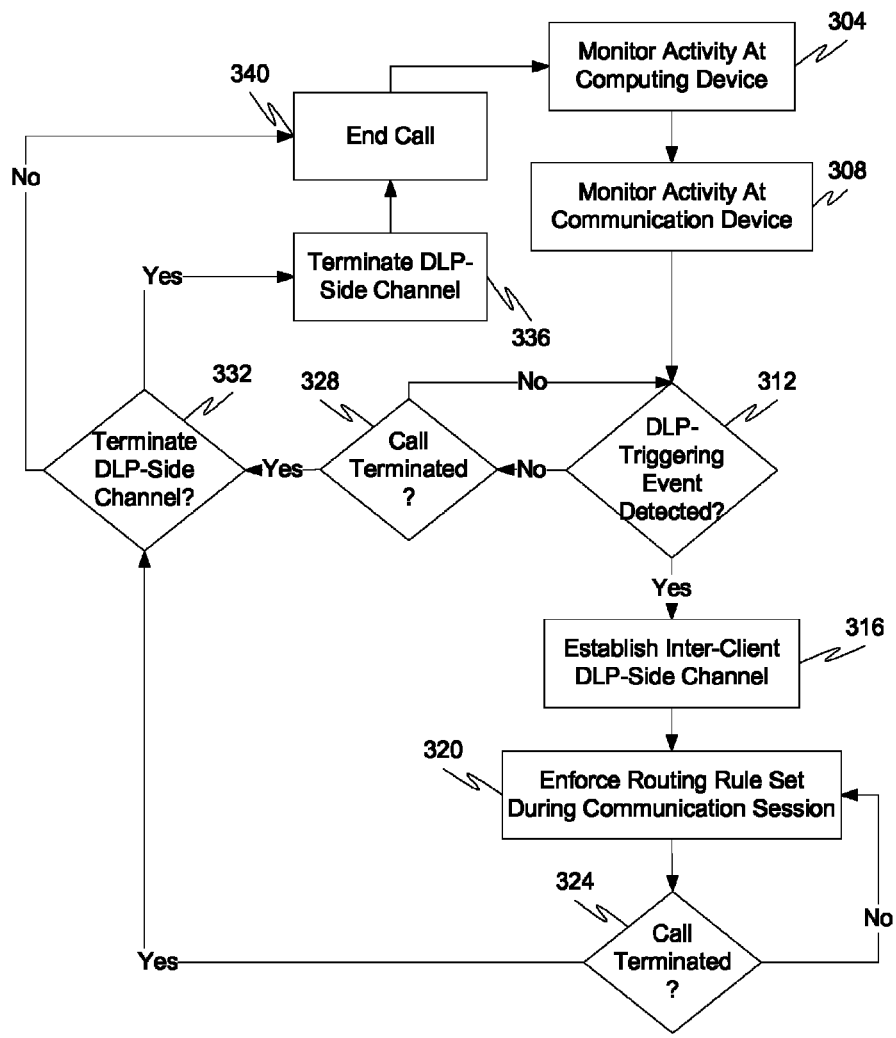
FIG. 3 is a flow diagram depicting a communication method in accordance with at least some embodiments of the present disclosure.

Referring now to FIG. 3, an exemplary communication method will be described in accordance with at least some embodiments of the present disclosure. Although the method will be described in connection with establishing a DLP-side channel between a computing device 116 and a communication device 112, embodiments of the present disclosure also contemplate the creation of a DLP-side channel between two computing devices 116 or two communication devices 112. The DLP-side channel established between the two devices can include either a one-way communications DLP-side channel or a two-way communications DLP-side channel which is dynamically created upon the detection of a DLP-triggering event.

The method is initiated by the DLP manager 224 monitoring activity at the computing device 116 (step 304) and the communication device 112 (step 308). The nature of activities monitored by the DLP manager 224 may depend upon the rule set 228 and the conditions associated therewith. It should be appreciated that the monitoring of the activities of devices may include monitoring user input at such devices, application activity at such devices, communication packets and messages received at such devices, communication packets and messages transmitted by such devices, and the like. Additionally, the activity of the client devices can be monitored at the access point 108, by analyzing packets or messages en route to or from the client devices.

As the DLP manager 224 monitors the activities of the client devices, the DLP manager 224 determines whether a DLP-triggering event has been detected (step 312). This determination may include comparing current conditions about the client devices with conditions in the rule set 228 that, if satisfied, trigger the establishment of a DLP-side channel. Examples of such conditions which may be included in the rule set 228 include, without limitation, (1) a predefined type of communication session has been or is being established by the communication device (e.g., a real-time communication session utilizing a Real-time Transport Protocol (RTP) is being established), (2) a communication session with a predefined party has been or is being established by the communication device, (3) a predefined media type (e.g., voice, video, text, and combinations thereof) is being used in the communication session, (4) a predefined application executed by the computing device is being used in the communication session (e.g., a softphone application is being used by the computing device 116 to assist the communication device 112), (5) the computing device 116 is within a predefined distance of the communication device 112 (this distance may be defined by the strength of signal, but is usually up to about 300 meters, depending upon environmental conditions or whether a signal amplifier is being utilized), and (6) combinations thereof.

If the DLP manager 224 answers the query of step 312 affirmatively, then the method continues with the DLP manager 224 causing an inter-client DLP-side channel to be established between the client devices (step 316). In particular, the third wireless communication link 212 is established between the communication device 112 and the computing device 116. The DLP-side channel may be established in accordance with any standard set forth in 802.11 (e.g., an 802.11x standard).

Once the third wireless communication link 212 is established, the method continues with the DLP manager 224 monitoring the communication packets transmitted during a communication session in which the communication device 112 is engaged. Particularly, the DLP manager 224 monitors each packet transmitted during the communication session to determine whether that packet is a client-to-client packet that is to be transmitted via the third wireless communication link 212 or whether the communication packet should not traverse the third wireless communication link 212 (i.e., the packet is not a client-to-client packet). More broadly speaking, the DLP manager 224 enforces routing rules contained within the rule set 228 for packets transmitted during the communication session which caused the third wireless communication link 212 to be established (step 320). Client-to-client packets may include video packets, high definition audio packets, high definition video packets, and control packets for use in connection with softphone application. The client-to-client packets may traverse the third wireless communication link 212 in either direction, without parting from the scope of the present disclosure.

Concurrent with enforcing the routing rules, the DLP manager 224 also analyzes the client devices to determine whether the communication session has terminated or whether any other event has occurred which warrants termination of the third wireless communication link 212 (step 324). If such a condition is not detected, then the method continues at step 320.

Otherwise, the method proceeds to step 332 to determine if the rules 228 dictate that the third wireless communication link 212 should be terminated with the termination of the communication session (step 332). If not, the communication session simply ends (step 340), but the third wireless communication link 212 is maintained, perhaps in anticipation of a new communication session that is to occur within the near future. The method then returns back to step 304.

If the query of step 332 is answered affirmatively, however, the third wireless communication link 212 is terminated (step 336) before the communication session ends or simultaneous with the communication session ending (step 340).

Referring back to the query of step 312, if a DLP-triggering event has not been detected, then the method proceeds to step 328 to determine if a previously established communication session has terminated (step 328). If not, the method returns to step 312. If so, the method proceeds to step 332.

While the above-described flowchart has been discussed in relation to a particular sequence of events, it should be appreciated that changes to this sequence can occur without materially effecting the operation of the disclosure. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this disclosure can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this disclosure.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication and computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into software and/or hardware system, such as the hardware and software systems of a communications device or system.

It is therefore apparent that there has been provided, in accordance with the present disclosure, systems, apparatuses and methods for managing communication applications. While this disclosure has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

What is claimed is:
1. A method, comprising:
   monitoring communication activity at one or more of a computing device and a communication device;

determining that a DLP-triggering event has occurred at one or both of the computing device and communication device; and based on the determining step, establishing a DLP-side channel between the computing device and the communication device, wherein th DLP-side channel is used to carry at some communication packets transmitted in connection with and during a communication session;

receiving communication packets at the communication device during the communication session;

analyzing the received communication packets;

determining that a first communication packet within the analyzed communication packets comprises a client-to-client communication packet;

transmitting the first communication packet via the DLP-sided channel to the computing device;

determining that a second communication packet within the analyzed communication packets does not comprise a client-to-client communication packet; and failing to transmit the second communication packet via the DLP-side channel to the computing device.

2. The method of claim 1, wherein the DLP-side channel is established for use during a two-way real-time communication session in which the communication device is engaged.

3. The method of claim 2, wherein the DLP-triggering event comprises the establishment of the communication session with the communication device.

4. The method of claim 3, wherein the DLP-side channel is established after the communication session is established by the communication device.

5. The method of claim 3, further comprising:
monitoring the communication session;
determining that the communication session has terminated; and
upon determining that the communication session has terminated, tearing down the DLP-side channel between the computing device and the communication device.

6. The method of claim 1, wherein the first communication packet comprises one or more of a video packet, a high definition audio packet, a high definition video packet, and a control packet for a softphone application.

7. The method of claim 1, wherein the DLP-triggering event comprises one or more conditions from the following set of conditions: (1) a predefined type of communication session has been or is being established by the communication device; (2) a communication session with a predefined party has been or is being established by the communication device; (3) a predefined media type is being used in the communication session; (4) a predefined application executed by the computing device is being used in the communication session; and (5) the computing device is within a predefined distance of the communication device.

8. A non-transitory computer readable medium encoded with processor executable instructions operable to, when executed, perform the method of claim 1.

9. A communication device, comprising:
a network interface capable of connecting the communication device with a computing device and a communication network either directly or via an access point;
memory containing processor-executable instructions, the instructions including:
a DLP manager, the DLP manager configured to monitor communication activity of the communication device, determine that a DLP-triggering event has occurred at communication device, and cause a DLP-side channel to be established between the communication device and a second device, wherein the DLP-side channel is used to carry at least some communication packets transmitted in connection with and during a communication session, the DLP manager further comprising a rule set for determining whether such communication packets are client-to-client communication packets, the DLP manager further configured to determine that a first communication packet within the analyzed communication packets comprises a client-to-client communication packet, and cause the first communication packet to be transmitted via the DLP-side channel to the second device; and
a processor for executing the instructions contained in the memory.

10. The device of claim 9, wherein the DLP-side channel is established for use during a communication session in which the communication device is engaged.

11. The device of claim 10, wherein the DLP-triggering event comprises the establishment of the communication session with the communication device.

12. The device of claim 11, wherein the DLP-side channel is established after the communication session is established by the communication device.

13. The method of claim 11, wherein the DLP manager is further configured to monitor the communication session, determine that the communication session has terminated, and upon determining that the communication session has terminated, tear down the DLP-side channel between the second device and the communication device.

14. The device of claim 9, wherein the second device comprises one or more of a stereo device, a television, and a portable audio player, and wherein the first communication packet comprises one or more of a video packet, a high definition audio packet, a high definition video packet, and a control packet for a softphone application.

15. The device of claim 9, wherein the DLP-triggering event comprises one or more conditions from the following set of conditions: (1) a predefined type of communication session has been or is being established by the communication device; (2) a communication session with a predefined party has been or is being established by the communication device; (3) a predefined media type is being used in the communication session; (4) a predefined application executed by the computing device is being used in the communication session; and (5) the computing device is within a predefined distance of the communication device.

16. A computer program product comprising computer executable instructions stored onto a non-transitory computer readable medium which, when executed by a processor of a computer, cause the processor to execute a method, the method comprising:
monitoring communication activity at one or more of a computing device and a communication device;
determining that a DLP-triggering event has occurred at one or both of the computing device and communication device; and
based on the determining step, causing a DLP-side channel to be established between the computing device and the communication device, wherein the DLP-side channel is used to carry at least some communication packets transmitted in connection with and during a communication session;
receiving communication packets at the communication device during the communication session;
analyzing the received communication packets;

determining that a first communication packet within the analyzed communication packets comprises a client-to-client communication packet;

transmitting the first communication packet via the DLP-side channel to the computing device;

determining that a second communication packet within the analyzed communication packet does not comprise a client-to-client communication packet; and failing to transmit the second communication packet via the DLP-side channel to the computing device.

17. The computer program product of claim 16, wherein the DLP-side channel is established according to 802.11x standards.

18. The computer program product of claim 17, wherein the DLP-side channel is established for use during a communication session in which the communication device is engaged and wherein the method further comprises:

monitoring the communication session;

determining that the communication session has terminated; and upon determining that the communication session has terminated, tearing down the DLP-side channel between the computing device and the communication device.

\* \* \* \* \*

UNITED STATES PATENT AND TRADEMARK OFFICE
CERTIFICATE OF CORRECTION

PATENT NO. : 8,411,700 B2  
APPLICATION NO. : 12/731850  
DATED : April 2, 2013  
INVENTOR(S) : Mahalingam Mani Page 1 of 1

It is certified that error appears in the above-identified patent and that said Letters Patent is hereby corrected as shown below:

In the Claims:

Column 11, line 6, delete "th" and insert --the--.

Column 11, line 7, insert --least-- between 'at' and 'some'.

Column 11, line 16, delete "sided" and insert --side--.

Signed and Sealed this  
Second Day of July, 2013

Teresa Stanek Rea  
*Acting Director of the United States Patent and Trademark Office*